Jan. 15, 1924.
W. K. HUNTER
1,481,061
MACHINE FOR REMOVING TIRES FROM RIMS
Filed July 20, 1922      2 Sheets-Sheet 1
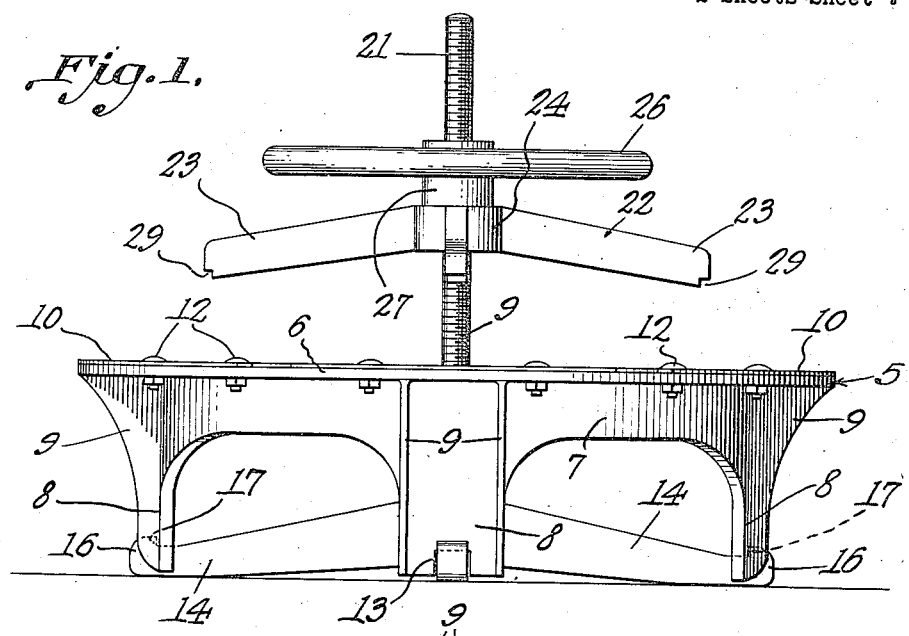
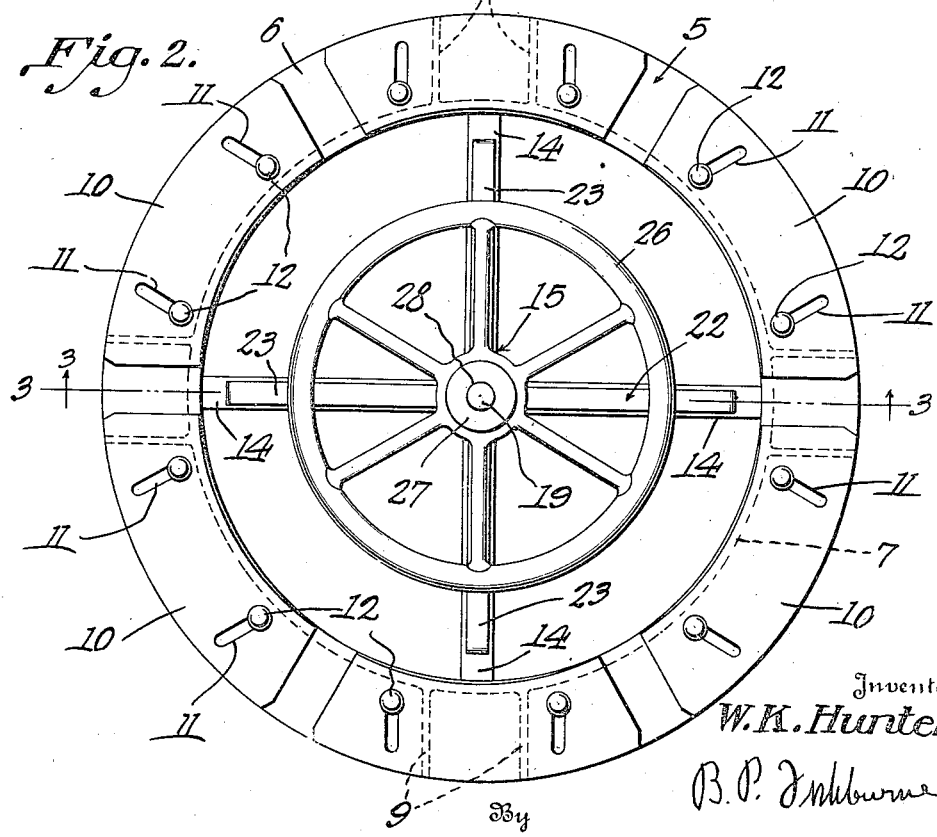
Inventor
W. K. Hunter
By B. P. Inkburne
Attorney

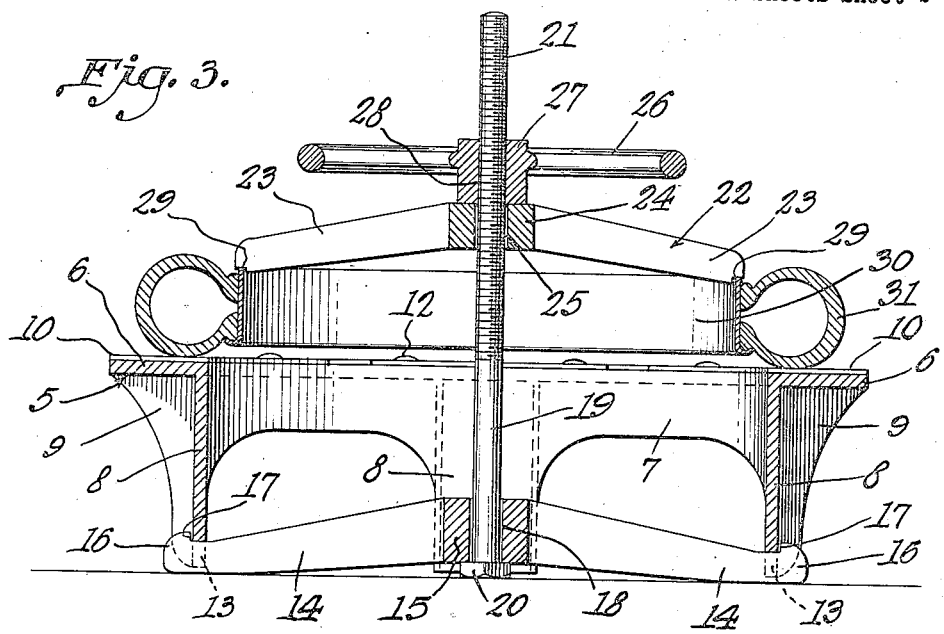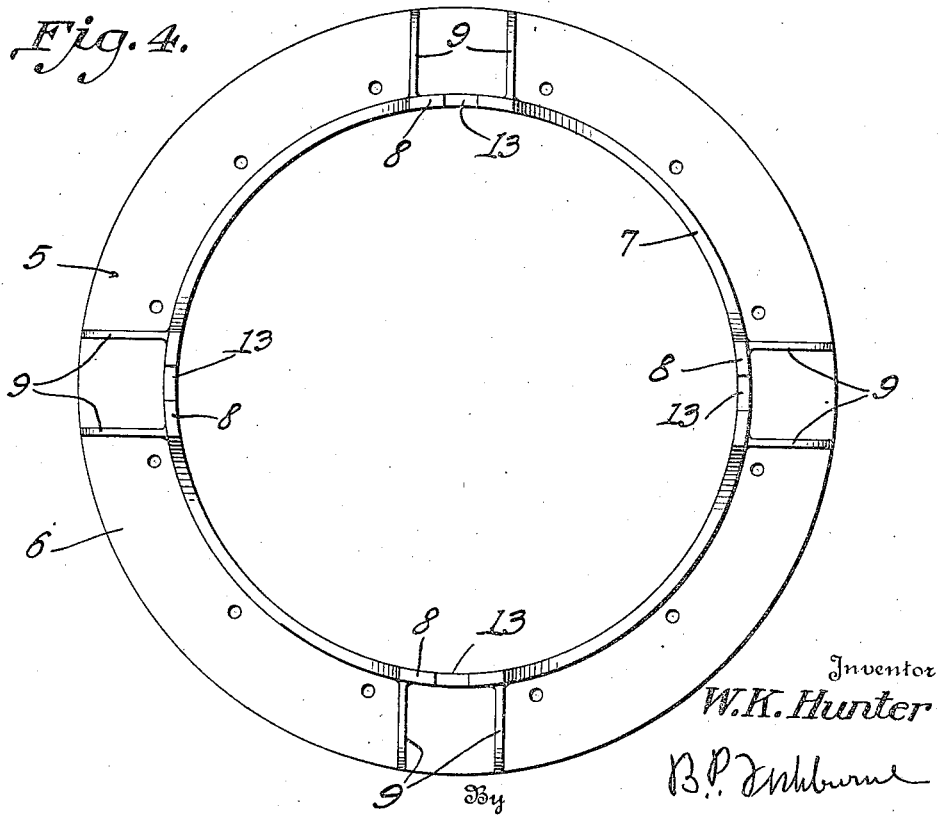

Patented Jan. 15, 1924.

1,481,061

UNITED STATES PATENT OFFICE.

WILLIAM K. HUNTER, OF COPPERHILL, TENNESSEE, ASSIGNOR OF ONE-HALF TO ALFRED W. TAYLOR, OF JOHNSON CITY, TENNESSEE.

MACHINE FOR REMOVING TIRES FROM RIMS.

Application filed July 20, 1922. Serial No. 576,344.

*To all whom it may concern:*

Be it known that I, WILLIAM K. HUNTER, citizen of the United States, residing at Copperhill, in the county of Polk and State of Tennessee, have invented certain new and useful Improvements in Machines for Removing Tires from Rims, of which the following is a specification.

My invention relates to improvements in apparatus for removing rims from pneumatic tires.

An important object of the invention is to provide a machine of the above mentioned character, formed of few and simple parts, which are easily separated or assembled.

A further object of the invention is to provide a machine of the above mentioned character, which is adjustable for operation upon tires of different diameters.

A further object of the invention is to provide a machine of the above mentioned character which is of simplified construction, and is easy and convenient to operate.

Other objects and advantages of the invention will be apparent during the course of the following description.

In the accompanying drawings forming a part of this specification and in which like numerals are employed to designate like parts throughout the same.

Fig. 1 is a side elevation of a machine embodying my invention,

Fig. 2 is a plan view of the same,

Fig. 3 is a vertical longitudinal section taken on line 3—3 of Fig. 2, and,

Fig. 4 is a bottom plan view of the table element.

In the drawings, wherein for the purpose of illustration is shown a preferred embodiment of my invention, the numeral 5 designates a table structure, as a whole, embodying an annular top 6, which is horizontally arranged. Formed integral with this annular top, at its inner edge, is a cylindrical vertical depending flange 7, having legs 8 formed integral therewith, as shown. The legs are reinforced by vertical webs 9, integral therewith and with the top 6.

The top 6 is designed to support the tire having the maximum diameter, and in order that the device may function with tires of smaller diameter, I provide radially adjustable support-plates 10, which are segmental, as shown, and slidably mounted upon the upper surface of the top 6. Each support plate 10 is provided with a pair of parallel slots 11, extending transversely thereof, receiving bolts 12, passing through openings in the top 6. The slots 11 thus permit the support-plates 10 to be shifted inwardly so that they project beyond the table 6, for supporting a tire of a smaller diameter. The invention is of course in no sense restricted to the adjustment of the support-plates inwardly of the top 6, as they may be adjusted outwardly of the same, if desired.

The legs 8 are provided at their bottoms with notches 13, receiving the arms 14 of a stationary spider 15, this spider preferably being an integral structure. The outer ends of the arms 14 project into the notches 13 and such outer ends have upwardly projecting heads 16, forming shoulders 17, which contact with the outer walls of the legs and prevent lateral displacement of the spider. It is preferred that the bottom edge of the arms project slightly below the lower ends of the legs 8, whereby the legs are held spaced from the floor or the like. The legs 8 are therefore supported upon the arms, and this serves to retain the parts together against rattling or shaking.

The spider 15 is provided in its central or hub portion with a vertical opening 18, to receive the lower end of a vertical shaft 19. This shaft is provided at its lower end with a head 20. The arms 14 are inclined upwardly slightly toward their inner ends, and the hub of the spider is slightly elevated, to make room for the head 20. The vertical shaft 19 is screw threaded, at 21, toward its upper portion, as shown.

The numeral 22 designates a removing element or spider, including radial arms 23, formed integral with a hub 24. The hub has an opening 25, to receive the vertical shaft 19, but this opening is not screw threaded, and is larger in diameter than the shaft 19, and hence the hub is free to move vertically upon the shaft. Arranged above the spider 22 is a hand wheel 26, embodying a hub 27, having a screw threaded opening 28, receiving the screw threaded portion of the shaft 19. It is thus seen that by turning the hand wheel 26 its hub 27 will move downwardly upon the shaft 19, and hence the spider 22 will be forced downwardly.

The arms 23 are provided at their ends and upon their lower faces with notches 29, to engage with a solid rim 30, carrying a pneumatic tire 31. The tire is supported upon the support-plates 10, as shown and when the spider 22 is forced downwardly, the rim 30 will be removed from within the tire, this rim falling into the cylindrical opening of the table structure, while the tire remains upon the support-plates. While the rim 30 is shown as having one edge straight, the flanged ring having been removed, it is of course obvious that the invention is in no sense restricted to the use of any particular type of rim. Instead of operating upon a demountable rim, the machine may be employed to remove a tire from a wheel having a clincher rim as is obvious.

In view of the foregoing description, it is thought that the operation of the device is obvious.

The machine consists of four principal parts, which are detachably connected. These parts are the table structure, the stationary spider, the upper movable spider and the hand wheel. These parts may be readily separated and arranged in close relation for shipping, when desired.

It is to be understood that the form of my invention herewith shown and described, is to be taken as a preferred example of the same, and that various changes in the shape, size, and arrangement of parts may be resorted to without departing from the spirit of my invention or the scope of the subjoined claims.

Having thus described my invention, I claim:

1. A machine for removing tires from rims, comprising a table structure including a top and legs depending therefrom, said legs being provided at their lower ends with notches, a spider arranged within the lower portion of the table structure and including arms having their outer ends received within said notches, said arms being provided at their outer ends with upwardly projecting heads adapted to engage the outer walls of said legs, an upstanding shaft secured to the spider and extending above the table structure, a removing spider slidable upon the shaft and having arms to engage the rim to force the same from the tire while the tire is supported upon said table top, and an operating element screw threaded upon the upper portion of the shaft and engaging the removing spider.

2. A machine for removing tires from rims, comprising a table structure embodying an annular top with depending legs having notches in their lower ends, segmental support plates slidable upon the upper surface of said annular top and provided with transverse slots, guide elements secured to the annular top and extending into the transverse slots, a lower spider having arms projecting into the notches in said legs, an upstanding shaft carried by said spider, an upper spider movable vertically upon said shaft, and an operating element having screw threaded engagement with said shaft to move the upper spider downwardly.

In testimony whereof I affix my signature.

WILLIAM K. HUNTER.